Dec. 13, 1927.
C. W. MURRAY, JR
1,652,453
VALVE
Filed July 23, 1927
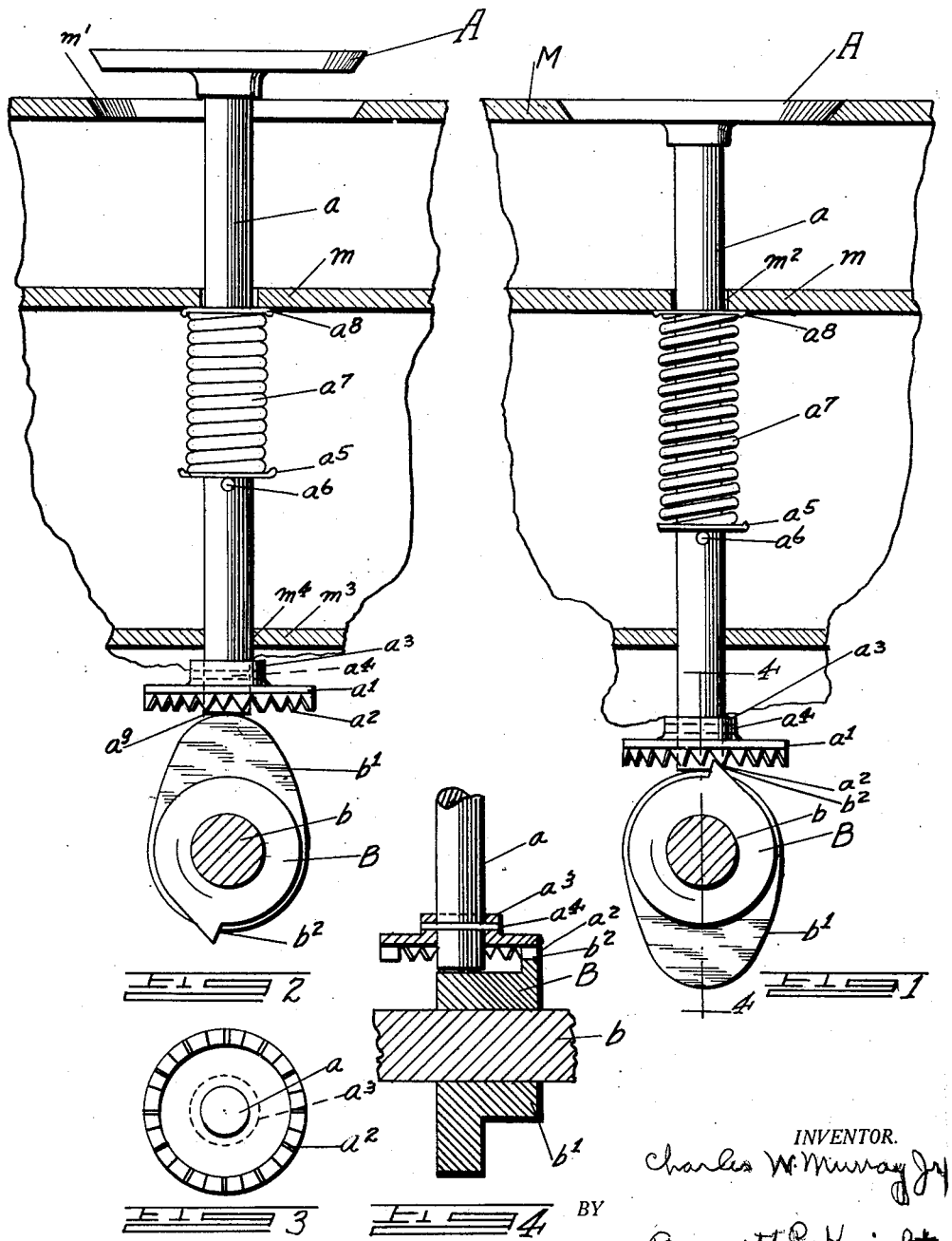

Patented Dec. 13, 1927.

1,652,453

UNITED STATES PATENT OFFICE.

CHARLES W. MURRAY, JR., OF CINCINNATI, OHIO.

VALVE.

Application filed July 23, 1927. Serial No. 207,884.

My invention relates to valves and more particularly to the operating mechanism for actuating and reseating such valves.

My valve is designed primarily for use in an internal combustion engine and is best adapted for that purpose, however, it may be used wherever the seat of a poppet valve is liable to fouling or corrosion and therefore will fail to seat tightly.

The principal object of my invention is to provide a valve embracing the advantageous features of both the poppet and sleeve valves and eliminating the incidental disadvantages of both.

This result is attained by providing means for rotating the valve while seated, thus grinding the valve and seat and keeping the coacting surfaces of both smooth and polished at all times. This insures a leak-tight fit and prevents fouling, grooving and pitting, resulting in leaking. Leaking causes loss of compression in an internal combustion engine.

Another object of my invention is to prevent warping of the valve stem by constantly changing its angular position during operation. The rotation also prevents sticking.

Valves now in use in automobile engines require grinding about every 5000 miles when ordinary gasolene is used. With my invention the valves continue effective almost indefinitely and need no grinding. No carbon or other foreign matter is allowed to pack on the valve seat due to the grinding effect of the rotation and, as a result, a very cheap grade of gasolene can be used effectively.

While it is generally considered that a sleeve valve is superior to a poppet valve for automotive use, yet sleeve valves are much more expensive to manufacture, require more battery power in the automobile and greatly increase oil consumption. My invention makes the poppet valve as effective as a sleeve valve and eliminates these objectionable features.

In the particular embodiment of my invention selected for illustration:—

Fig. 1 is a rear elevation of the valve and the actuating cam and its shaft, the valve seat, lugs on the valve case of the engine and cam shaft being shown in section with parts unnecessary to this disclosure broken away. The valve is shown seated, Fig. 2 is a view similar to Fig. 1 but with the valve unseated, Fig. 3, a detail, is a bottom plan view of the ratchet wheel, and Fig. 4 is a cross-section on the line 4—4 of Fig. 1.

Referring now to the drawings the valve A has a stem $a$. The valve A is adapted to coact with a seat $m^1$ formed in the valve casing M. A ratchet wheel $a^1$ having ratchet teeth $a^2$ and hub $a^3$ is secured to the stem $a$ near its lower end by pin $a^4$ or in any other suitable manner. The stem $a$ passes thru holes $m^2$ and $m^4$ thru the lugs $m$ and $m^3$ respectively of the valve case of the engine which act as guides. On the valve stem $a$ is a coiled spring $a^7$ with a cup-washer $a^8$ at the top seated against the lug $m$, and a similar washer $a^5$ at the bottom, secured against downward movement by the pin $a^6$. The lower end $a^9$ of the stem $a$ projects a short distance below the ratchet teeth $a^2$ so that the actuating cam, hereinafter described, will bear against $a^9$ and prevent its point contacting with the teeth. Suitable bearings (not shown) may be placed between the shoulder $m$ and valve stem, and a ball bearing collar or other friction reducing device (not shown) may be inserted between the top of the washer $a^5$ and spring $a^7$.

An operating cam B is rotatably secured to the cam shaft $b$. Opposite the point $b^1$ and at one side of the peripheral face of the cam B is a tooth or pawl $b^2$ adapted to engage the ratchet teeth $a^2$.

It can be seen in Fig. 1, that while the valve is seated the point $b^1$ of the cam B is away from the end $a^9$ of the valve stem $a$ and the tooth or pawl $b^2$ is rotating the valve while seated. In Fig. 2 the valve is shown open and the tooth $b^2$ out of contact with the teeth $a^2$ of the ratchet wheel and the point $b^1$ is raising the valve stem $a$.

While I have shown a single pawl on the cam B a plurality of such teeth may be used instead.

I do not wish to be limited to the precise form of device shown but claim as within the scope of my invention all devices readable on the claims.

I claim as my invention and desire to secure by Letters Patent of the United States:

1. In combination, a valve and a stem for said valve, a ratchet wheel secured to said stem, a cam to open said valve and a pawl on said cam adapted to coact with said ratchet teeth and rotate said valve while seated.

2. Poppet valve mechanism having in combination a valve seat, a valve adapted to coact with said seat, a stem fixed to said valve, a spring constantly tending to keep said valve closed, a ratchet wheel fixed to said stem, a cam having a point adapted to open said valve, a pawl on said cam opposite said point and adapted to coact with the teeth of said ratchet wheel and means for rotating said cam.

3. Valve mechanism comprising a valve seat, a valve adapted to coact with said seat, a stem fixed to said valve, a pair of cup-washers on said stem and a spring compressed between said washers constantly tending to keep said valve seated, a ratchet wheel secured to said stem, a cam shaft and a cam on said shaft, a point on said cam to unseat said valve, a pawl on said cam opposite said point and adapted to coact with the teeth of said ratchet to rotate said valve when seated.

4. Valve mechanism comprising a valve seat, a valve adapted to coact with said seat, a stem fixed to said valve, a pair of cup-washers on said stem and a spring compressed between said washers constantly tending to keep said valve seated, a ratchet wheel secured to said stem, a cam shaft and a cam on said shaft, a point on said cam to unseat said valve, a pawl at one side of the periphery of said cam opposite said point and adapted to coact with the teeth of said ratchet wheel to rotate said valve when seated.

In testimony whereof I have hereunto set my hand.

CHARLES W. MURRAY, Jr.